(12) United States Patent
Bulusu et al.

(10) Patent No.: US 10,853,867 B1
(45) Date of Patent: Dec. 1, 2020

(54) RECOMMENDATION ENGINE USING ACTION NODE MAPPING

(71) Applicant: Amazon Technologies, Inc., Seattle, WA (US)

(72) Inventors: Prakash Bulusu, Bangalore (IN); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 15/478,144

(22) Filed: Apr. 3, 2017

(51) Int. Cl.
  *G06Q 30/00* (2012.01)
  *G06Q 30/06* (2012.01)
(52) U.S. Cl.
  CPC ................. *G06Q 30/0631* (2013.01)
(58) Field of Classification Search
  CPC .................................................. G06Q 30/0631
  See application file for complete search history.

(56) References Cited

U.S. PATENT DOCUMENTS

2015/0269609 A1* 9/2015 Mehanian .......... G06Q 30/0246
                                                        705/14.45
2018/0075516 A1* 3/2018 Barkan .............. G06Q 30/0631

OTHER PUBLICATIONS

Renjith, Shini. "An Integrated Framework to Recommend Personalized Retention Actions to Control B2C E-Commerce Customer Churn." International Journal of Engineering Trends and Technology 27.3 (2015): 152-157. Crossref. Web.*

* cited by examiner

*Primary Examiner* — Kathleen Palavecino
(74) *Attorney, Agent, or Firm* — Kilpatrick Townsend & Stockton LLP

(57) ABSTRACT

Described herein are a system and methods for providing action recommendations to a user that are likely to result in performance of a high-value action. In some embodiments, the user is compared to one or more other users in order to identify high-value actions for that user. Once at least one high-value action has been identified, a sequence of actions may be generated to include that high-value action using prediction model data that includes probability information. The sequence of actions is then assessed to determine a gateway action within the sequence of actions that is likely to be performed by the user and has a high likelihood of resulting in subsequent performance of the high-value action. The gateway action may then be presented to the user.

20 Claims, 8 Drawing Sheets

RECOMMENDATION ENGINE USING ACTION NODE MAPPING

BACKGROUND

With the drastic growth of online commerce in recent years and the corresponding growth in competition, electronic retailers are finding it increasingly difficult to maximize customer spending on their sites. One way in which an electronic retailer is able to distinguish itself from its competition is through the use of an effective recommendation engine. However, recommendations provided by these recommendation engines are often simply aligned with the user's already known interests. For example, if the recommendation engine is provided information that a target user likes a particular type of good or service, the recommendation engine may simply provide a recommendation to purchase that good or service. Other recommendation engines may identify similarities between a target user and other users and may provide recommendations based on what users similar to the target user are interested in. However, recommendations personalized in this manner only reinforce what the user already knows he or she likes and prevents exposure to new things that the user would likely enjoy. For example, in conventional systems, users are only exposed to recommendations within their existing realm of interests and their tendency towards specific behaviors are reinforced by creating self-referential loops. This is often referred to as the serendipity problem, which stems from the fact that the goal of such systems is to find items that best match a user's preferences in order to improve accuracy, irrespective of their actual usefulness and future value to the system. Due to the serendipity problem, users are often left unaware of alternatives that they may enjoy.

BRIEF DESCRIPTION OF THE DRAWINGS

Various embodiments in accordance with the present disclosure will be described with reference to the drawings, in which.

DETAILED DESCRIPTION

Figure 1:
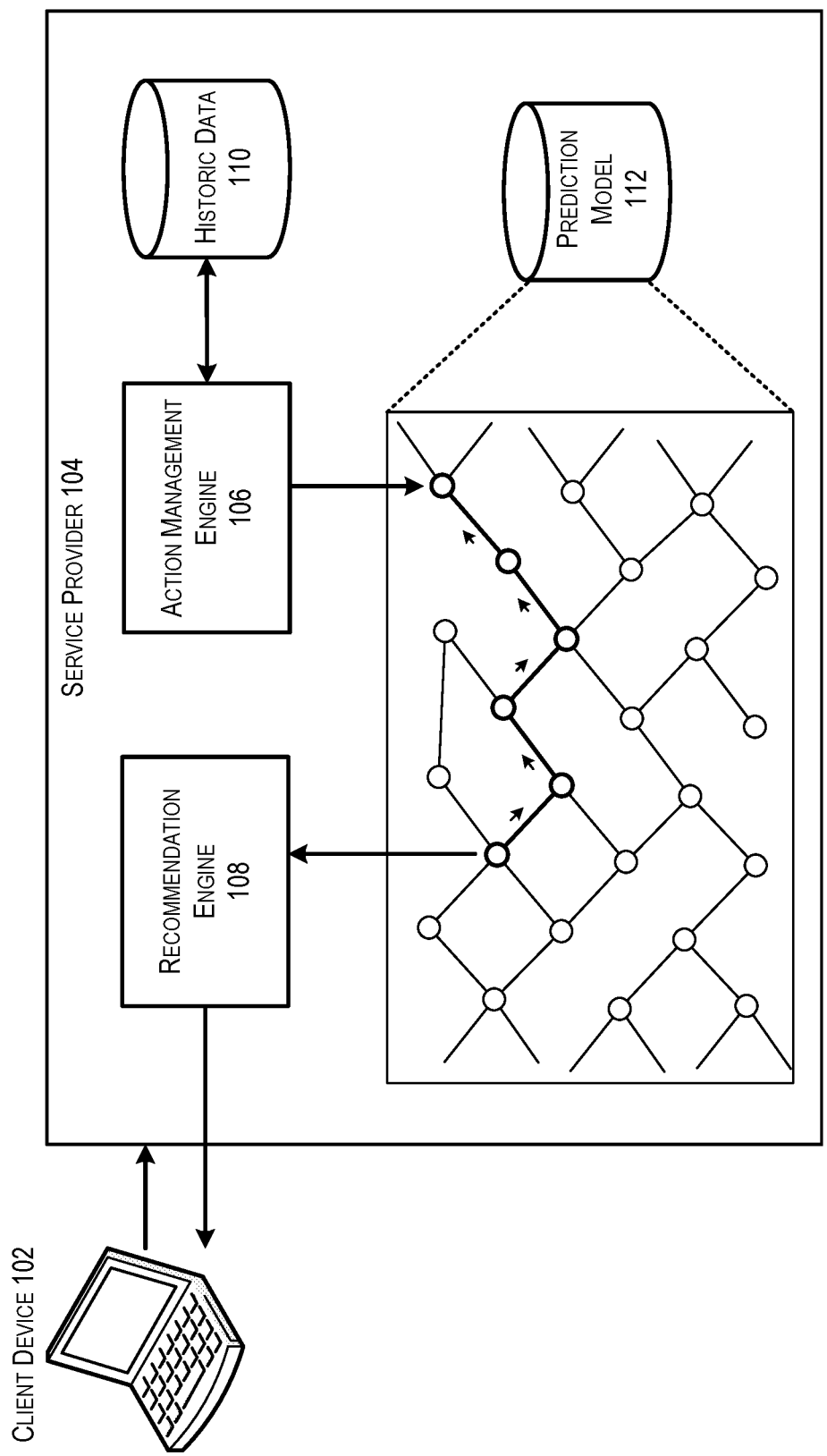
FIG. 1 depicts an illustrative example of a system that identifies actions likely to result in high revenue generation for the system to recommend to a user based on information associated with that user.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for providing a recommendation to a user to perform an action that may subsequently result in the user subsequently performing a high-value action. In some embodiments, the system generates prediction model data that contains information associated with relationships between actions that may be performed by one or more users. The system may assess a target user in order to determine which actions may constitute high-value actions for the target user. The system may then, using the prediction model data, generate a sequence of actions that includes the high-value action, such that performance of at least one action in the sequence of actions is predicted to result in performance of the high-value action. From this sequence of actions, the system may select an action that the target user is likely to engage in to be provided in a recommendation to that target user.

By way of illustration, consider the scenario in which the system is operated by an online retailer having an online marketplace. In this scenario, consider that the online retailer may wish to make a recommendation to a target user of the online marketplace. As an initial step, the online retailer may determine that the target user shares similar characteristics to other users which have spent a large amount of money on online music subscriptions. Hence, the online retailer may determine that if the target user was to be exposed to the online music subscription, the target user would like it. However, the online retailer may also determine that simply presenting a recommendation to purchase an online music subscription to the target user would be ineffective as the target user is unaware of their potential interest. In this scenario, the online retailer may determine that users who purchase connected audio presentation devices often later purchase music subscriptions. The online retailer may also determine that users who participate in product testing often subsequently purchase the product that they are testing. In this scenario, the online retailer may determine that the target user is likely to participate in product testing, and so may provide an invitation to the target user to participate in a product testing for a connected audio presentation device. In this scenario, the user may elect to participate in the product testing of the connected audio presentation device, subsequently purchase the connected audio presentation device, and eventually discover that they are interested in online music subscriptions.

Some non-limiting examples of actions include purchases, clicks, membership signups, interactions with devices such as e-book readers and audio presentation devices, creation of wish lists, registering for trials, streaming digital content, subscriptions, using deals and coupons, and any other suitable type of action. A high-value action may be one predicted to result in a large amount of benefit to a service provider (e.g., one predicted to result in a large amount of revenue or profit). The determination as to whether an action is a high-value action or not may be made based on the user being considered. For example, an action may be determined to be a high-value action for a first user and not a high-value action for a second user.

FIG. 1 depicts an illustrative example of a system that identifies actions likely to result in high revenue generation for the system to recommend to a user based on information associated with that user. In FIG. 1, a client device 102 may be in communication with a service provider 104. The service provider 104 may include a number of modules for implementing embodiments of the disclosure, including a recommendation engine 108, an action management engine 106. In addition, the service provider 104 may include various data used in providing a recommendation, including at least historic data 110 and/or a prediction model 112.

In some embodiments, the action management engine 106 may include computer executable instructions configured to cause a processor to assess various actions with respect to a number of users. In some embodiments, an action management engine 106 may assess the value of a particular action with respect to a user. To do this, the action management engine 106 may identify a group of users similar to a user being considered. The action management engine 106 may then identify a value for a particular action with respect to that group of users. A value to be associated with a particular action for a group of users may be calculated in a number of ways. For example, an average value of the transaction may be calculated for a group by determining an average amount of revenue that has been generated by group of users upon performance of the action. In some embodiments, users may be associated with a group of users based on any suitable indication of similarity. For example, the user may have a similar transaction history to other users of the group of users. In some embodiments, one or more clustering techniques may be used to associate a user with a group of users.

In some embodiments, the action management engine 106 may be configured to identity high-value actions with respect to a particular user (e.g., actions that are predicted to result in value criteria over a threshold amount). The action management engine 106 may be configured to, based on the prediction model 112, identify a sequence of actions likely to result in the determined high-value action. This is described in greater detail below.

In some embodiments, the recommendation engine 108 may include computer executable instructions configured to cause a processor to identify an action to be presented to a user. In some embodiments, the recommendation engine 108 may be configured to identify an action within a sequence of actions that a user is likely to engage in. This is described in greater detail below.

In some embodiments, the historic data 110 may include information related to a number of actions performed by a number of users. In some embodiments, the system may comprise an online marketplace that includes an electronic catalog (e.g., a data repository that includes information associated with a number of offered products). At least some of the actions included in the historic data may comprise actions performed with respect to products listed in the electronic catalog. A product may be any available good or service, to include digital goods. By way of illustrative example, actions may include a user viewing a website related to an available product, the user reading reviews for a product, the user placing a product into a virtual shopping cart, or any other suitable interaction with a product.

In some embodiments, the prediction model 112 may include a number of action nodes (each corresponding to actions that may be performed by a user) which are interconnected in some fashion. For example, the prediction model 112 may comprise a plurality of action nodes and connectors between those action nodes wherein the connectors are assigned some weight that represents a relationship between the two action nodes connected (e.g., a correlation between performance of one action and performance of the other action). In some embodiments, a prediction model may be generated using one or more machine learning techniques which are trained using historical data. In some embodiments, a relationship between two of the actions in the prediction model may be updated each time that new data is received with respect to each of the two actions. For example, upon detecting that a user performed Action 1 and then performed Action 2, the system may update the prediction model to indicate that the performance of Action 2 is more highly correlated to the performance of Action 1. In some embodiments, relationship information used by the prediction model may be time-sensitive, in that only relatively recent actions may be considered. The phrase "relatively recent" may include data from the last year, the last three months, the last month, or any other span of time leading up to the present, and may vary depending on circumstances and a number of factors. In some embodiments, calculating a correlation between two actions may also take into account the amount of time that has lapsed between performance of the two actions and/or the number of other actions performed in between performance of the two actions.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
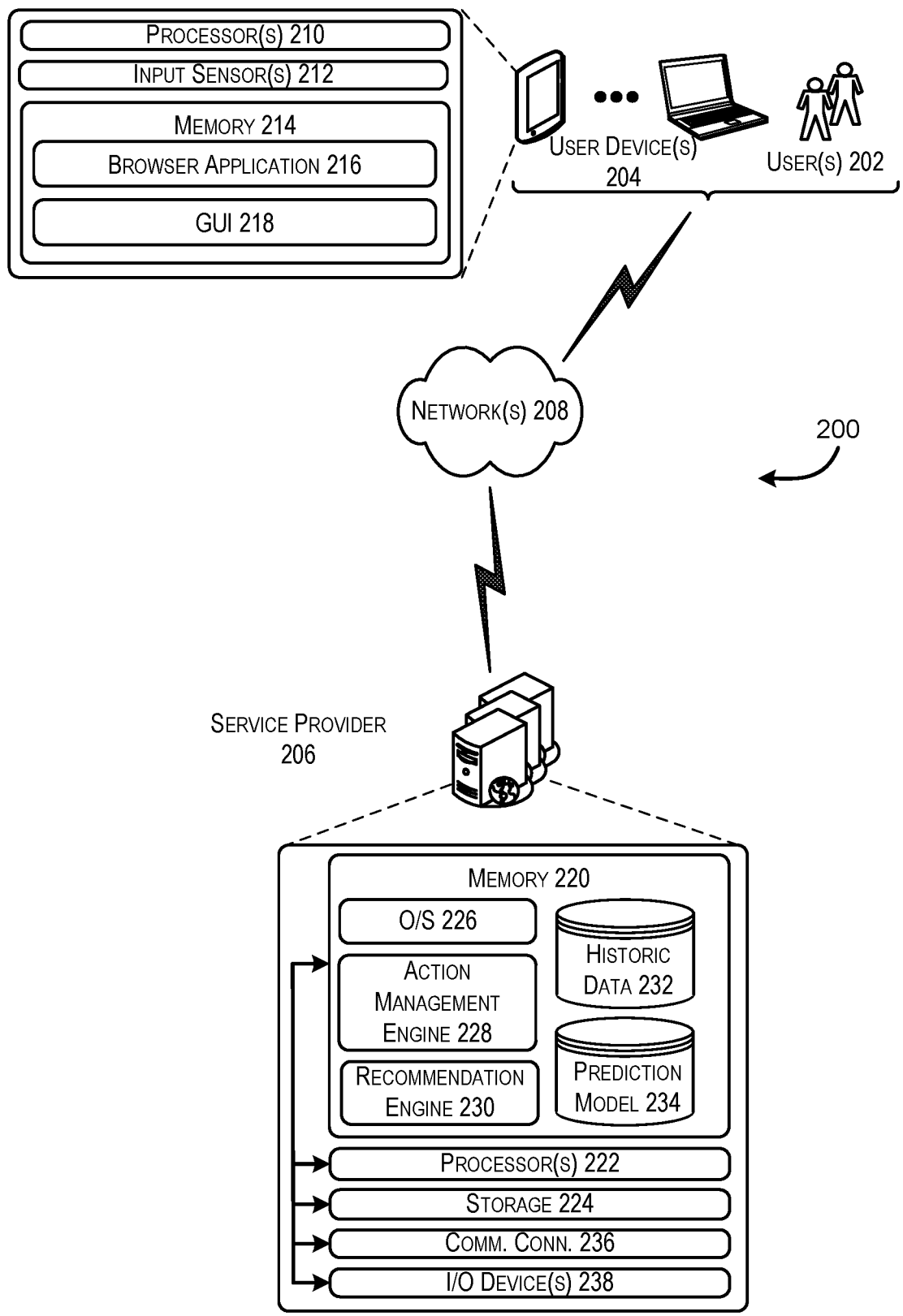
FIG. 2 depicts an illustrative example of a system or architecture in which techniques for providing a user with a recommendation for an action to be performed by that user may be implemented.

FIG. 2 depicts an illustrative example of a system or architecture 200 in which techniques for providing a user with a recommendation for an action to be performed by that user may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include a graphical user interface (GUI) 218 that is capable of presenting recommended actions to a user. Although sample architecture 200 depicts a GUI 218 as being included in the contents of the memory 214 of the user device 204, some embodiments may not include a GUI 218 in memory 214 of the user device 204. In those embodiments in which the GUI 218 is not included in memory 214, input received by the input sensors 212 may instead be processed by the service provider 206. This will be described in detail below.

In some embodiments, the GUI 218 may be configured to receive an action recommendation provided by the service provider and present the received action recommendation to a user 202. In some embodiments, the GUI 218 may be implemented by a mobile application installed on the user device 204. For example, the user device may have installed on it an application that enables communication between it and the service provider 206. In this example, the GUI 218 may be implemented by the mobile application in order to enable interaction between the user 202 and the service provider. It should be noted that some embodiments of the disclosure may not include a mobile application with GUI 218. In at least some of these embodiments, the browser 216 may be used to implement at least a portion of the purposes served by GUI 218.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for assessing a value of an action with respect to one or more users (action management engine 228) and/or a module for providing a recommended action to a user device 204 (recommendation engine 230). The memory 220 may also include historic data 232, which provides information related to actions performed by users in the past and/or prediction model data 234, which provides information on relationships between actions that may be used to predict future behavior. In some embodiments, historic data 232 and/or prediction model data 234 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 236 that allow the service provider 206 to communicate with a stored database, another computing device or server, user terminals, and/or other devices on the network(s) 208. The service provider 206 may also include input/output (I/O) device(s) and/or ports 238, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing historic data 232, a database containing prediction model data 234, and the one or more application programs or services for implementing the features disclosed herein, including an action management engine 228 and a recommendation engine 230.

In some embodiments, the action management engine 228 may be configured to calculate, using historic data 232, a value for one or more actions that may be performed by a user. A value of an action may be any benefit to be gained by performance of the action (e.g., an amount of revenue generated by performance of the action, etc.). In some embodiments, the value may be specific to a particular user. In some embodiments, the value may be specific to a group of users. For example, the service provider 206 may group one or more users based on similarities between those users. In some embodiments, one or more clustering techniques may be used to create groups of users based on attributes associated with the users. It should be recognized that various clustering techniques are known to those skilled in the art and will not be described in detail here. Users may be reassigned or moved to a new group as new information is obtained. For example, a user's group may be re-calculated each time that the user performs an action or conducts a transaction. In some embodiments, each user may belong to a plurality of groups. In some embodiments, the user may belong to a number of different groups depending on a type of action being assessed. For example, the user may belong to Group 1 when assessing a value for an action of type 1 and the user may belong to Group 2 when assessing a value for an action of type 2.

Once the service provider 206 has identified a number of groups of users, the service provider may calculate a value for each action with respect to each of the groups. For example, the service provider may identify each of the users within a particular group that have performed a specified action and the amount of revenue that resulted from that action. The service provider may then calculate an average value for the action with respect to the users that have performed the action in that group. Once a value has been determined for the action with respect to the group, that value may be attributed to each of the members of the group that have not yet performed the action. It should be noted that an action may be associated with different values with respect to different groups of users for which the value is calculated.

In some embodiments, the action management engine 228 may be further configured to identify, for each user or group of users, high-value actions. A high-value action may be any action for which the calculated value exceeds a threshold value. In some embodiments, the threshold value may be an objective value (e.g., $50.00). In some embodiments, the threshold value may be relative to other calculated values. For example, a high-value action for a particular user may be identified if the value estimated for that action is within the top 20% of estimated values for all potential actions for that user. Various embodiments of processes that may be performed by the action management engine 228 are described in greater detail below.

In some embodiments, the recommendation engine 230 may be configured to receive information related to values assigned to various actions from the action management engine 228 and identify an action to be presented to a user. In some embodiments, the recommendation engine 230 may be configured to, upon receiving an indication of a high-value action, generate a sequence of actions (based on prediction model data 234) likely to result in performance of the high-value action. In some embodiments, a sequence of actions may include two or more ordered actions. Various embodiments of processes that may be performed by the recommendation engine 230 are described in greater detail below.

Figure 3:
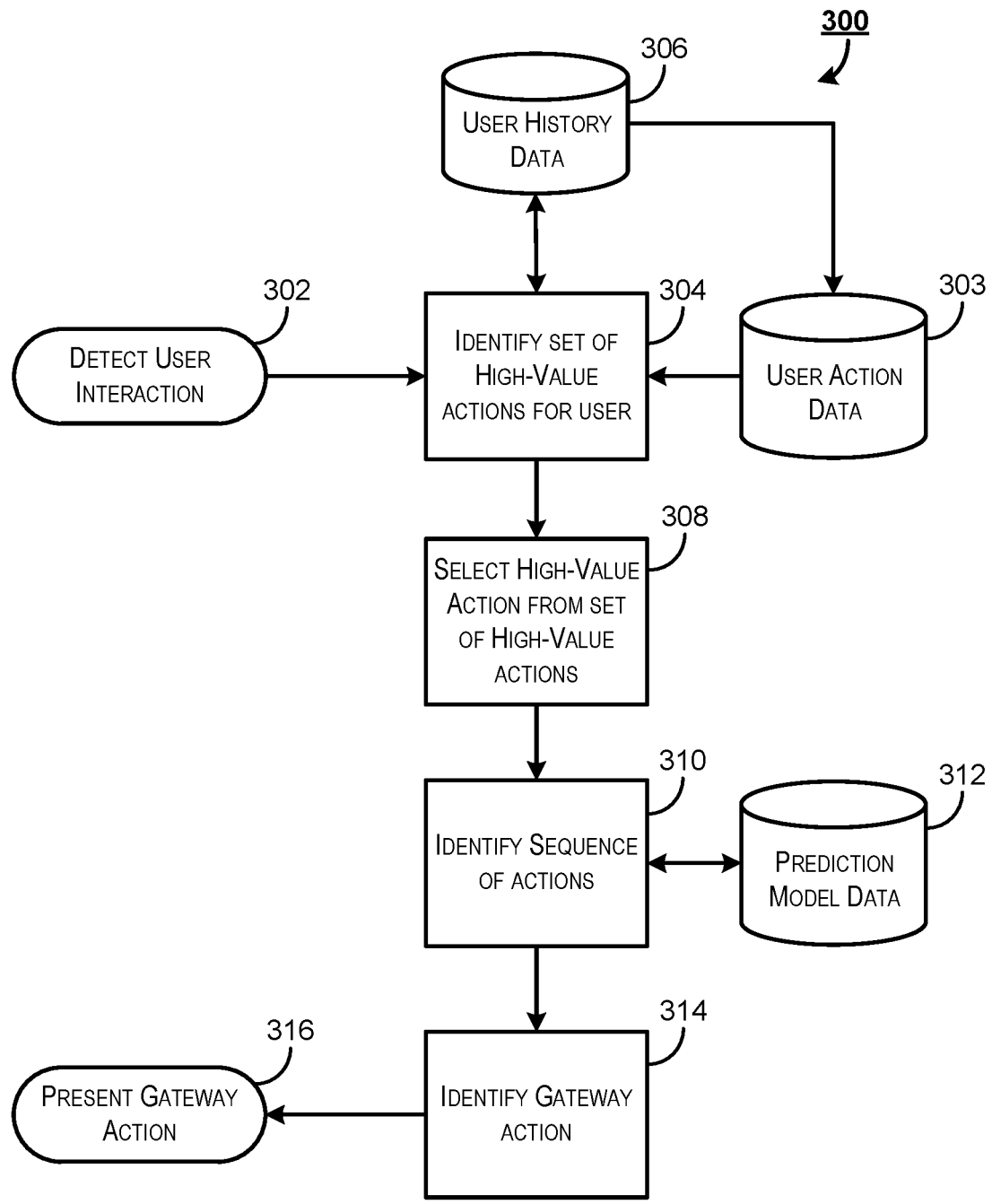
FIG. 3 depicts a flow chart illustrating an example process for identifying a high-value action for a user and providing a recommendation to the user for an action to be performed.

FIG. 3 depicts a flow chart illustrating a process for identifying a high-value action for a user and providing a recommendation to the user for an action to be performed. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the process 300 may be implemented at least partially by the service provider 206 depicted in FIG. 2.

In accordance with at least some embodiments, process 300 may begin at 302, when a user interaction is detected. In some embodiments, an indication of a user interaction may include any indication that the user is in communication with the service provider and is able to receive a recommendation. For example, the user may log into a mobile application installed upon a user device, that enables communication with the service provider. In this example, the user may be identified based on login information. In a second example, the user interaction may include the user visiting a website operated by the service provider. In this second example, the user may be identified based on an internet protocol address from which the website is accessed.

In some embodiments, user action data 303 is generated from the user history data with respect to a user. Actions may be related to purchase events (e.g., transactions completed by the user) and non-purchase events (e.g., enrolling in a program, reading a review, visiting a website, etc.). In some embodiments, the actions may be performed with respect to systems that are separate from the service provider. For example, the user may engage in an action with an audio presentation device, a connected television, an internet of things (IoT) device, or any other suitable device. User action data 303 may be used to identify a user's propensity (e.g., likelihood) to perform a particular action. Generation of user action data 303 is described in greater detail with respect to FIG. 7 below.

At 304, the service provider may identify a set of high-value actions for a target user from the user action data 303. In some embodiments, this may be done by ascertaining a group or groups to which the target user belongs, determining a value for various actions with respect to that group or groups, and identifying actions for which the determined value is over a threshold value.

In some embodiments, the service provider may identify a set of high-value actions for a target user by first identifying one or more groups of users to which the target user belongs. For example, the service provider may determine, based on historical data 306 (e.g., user transaction history data), that the user shares similar characteristics with various other users. In this example, the service provider may group the target user with the other users and make assumptions about the target user based on the determined similarities. In some embodiments, the service provider may identify groups (e.g., clusters) of users by using one or more clustering techniques. In some embodiments, the service provider may be provided with an indication of a group or groups to which the user belongs by a third party entity (i.e., an entity unaffiliated with the service provider).

Once the service provider has identified a group or groups of users to which a target user belongs, the service provider may calculate a value for an action with respect to the group or groups of users. In some embodiments, this may include identifying each of the users that have performed the action in the past via the historic data 306 and identifying a total value associated with the performance of those actions in the past. The service provider may then calculate an average (e.g., a mean) value of the action with respect to the users in the group that have performed the action. This value may then be ascribed to the users in the group that have not yet performed the action. In some embodiments, for the purposes of calculating a value for an action, repeating the action may constitute a separate action than performing the action for the first time. Once the value of each potential action has been calculated, high-value actions may be determined for a target user or group of users based on the calculated values associated with each of the actions. In some embodiments, a set of high-value actions may be identified as each of the actions for which a value associated with that action for a user or group is over a threshold value. In some embodiments, a set of high-value actions may be identified as the X actions having the highest associated value for the user or group, where X is some threshold. In these embodiments, X may be a numeric value or it may be a percentage.

The service provider may calculate a total value of an action based on a benefit generated either directly or indirectly as a result of the performance of the action. In some embodiments, the value of an action may be negative. For example, the service provider may estimate that the costs associated with users in a group performing a particular action outweigh any benefit gained by those users performing the action. In some embodiments, a value to be associated with an action may be calculated to include any revenue generated subsequent to performance of the action by the user, irrespective of whether the revenue was generated as a result of the action. For example, if a user performs an action and subsequently (e.g., within a short time frame) makes a purchase, then the revenue for the purchase may be attributed to the user's performance of the action whether or not there is any obvious relationship between the action and the purchase. Because of this, the system may exploit relationships between an action and revenue, even if those relationships are not readily apparent.

At 308, the service provider may select a high-value action from the set of identified high-value actions. In some embodiments, the service provider may select the action associated with the highest value for the target user. In some embodiments, the service provider may select an action from the set of high-value actions for which a recommendation has not previously been presented to the target user. In some embodiments, the service provider may select a high-value action from the set of identified high-value actions based on user interests (either past or present). For example, the high-value action may be selected because of its relationship to various transactions conducted by the user in the past. In another example, the high-value action may be selected from the set of identified high-value actions because of its relationship to a current status of the user. By way of further illustration, the high-value action may be selected because of its relationship to a website that the user is currently viewing.

At 310, the service provider may identify a sequence of actions. As depicted, the service provider may use prediction model data 312 to generate the sequence of actions. In some embodiments, various machine learning techniques may be used to generate the prediction model data. For example, prediction model data may be generated by training a machine learning algorithm using historical data (e.g., historical transaction data). The prediction model data may include indications of a number of actions and likelihoods that performance of a first action may lead to performance of a second action.

In some embodiments, the sequence of actions may be generated by using an algorithm to identify actions that are likely to lead to the performance of the selected high-value action. For example, the service provider may use a random walk with restarts (RWR) algorithm to identify sequences of actions likely to result in performance of the high-value action. In some embodiments, the service provider may generate a sequence of actions by iteratively selecting the action which has the highest probability of leading to a current action and appending that action to the sequence of actions. In some embodiments, the sequence of actions may be completed when there are no actions that can be identified that are likely to result in performance of a current action, or no actions that can be identified for which a likelihood to result in performance of the current action is above a threshold value. This will be described in greater detail below. In some embodiments, multiple sequences of actions may be generated for a single high-value action and the service provider may select an appropriate sequence of actions from those multiple sequences. A particular sequence of actions may be selected from the multiple generated sequences of actions based on any suitable factors. For example, the service provider may select the sequence of actions having the highest likelihood of resulting in performance of the high-value action. In another example, the service provider may select the sequence of actions having the highest total value (e.g., as a sum of values associated with the actions of the sequence of actions).

At 314, the service provider may identify a gateway action within the sequence of actions. In some embodiments, the gateway action may be the first action in the sequence of actions. In some embodiments, the gateway action may be identified as the action within the sequence of actions that is most likely to result in performance of the high-value action. For example, upon determining that Action C is a high-value action for a User A, the recommendation engine 230 may determine that users that perform Action B have a 90% chance of subsequently performing Action C. In this example, the recommendation engine 230 may also determine that users that perform Action A have an 80% chance of subsequently performing Action B. Based on this, performance of Action A by User A results in a 72% probability that User A will at some point perform Action C. In this example, Actions A and B may not be high-value actions. In fact, one or more of Actions A and B may be associated with a negative value (e.g., a loss). Based on this analysis, the recommendation engine 230 may generate the sequence of actions: (Action A, Action B, Action C). In some embodiments, the service provider may also calculate a likelihood of User A performing each of the actions in the sequence of actions. For example, the recommendation engine 230 may determine, based on historical data for User A, that User A is 80% likely to perform Action A in response to a recommendation to do so, whereas User A is 60% likely to perform Action B in response to a recommendation to do so. Based on this analysis, the recommendation engine 230 may calculate that presenting a recommendation for Action A is 57.6% likely to result in the performance of Action C, whereas presenting a recommendation for Action B is 54% likely to result in the performance of Action C. Action A may be classified as a gateway action, in that it is the action in the sequence of actions that, if presented to a user, is most likely to result in the performance of the high-value action. At 316, the service provider may cause the identified gateway action to be presented to the user.

Figure 4:
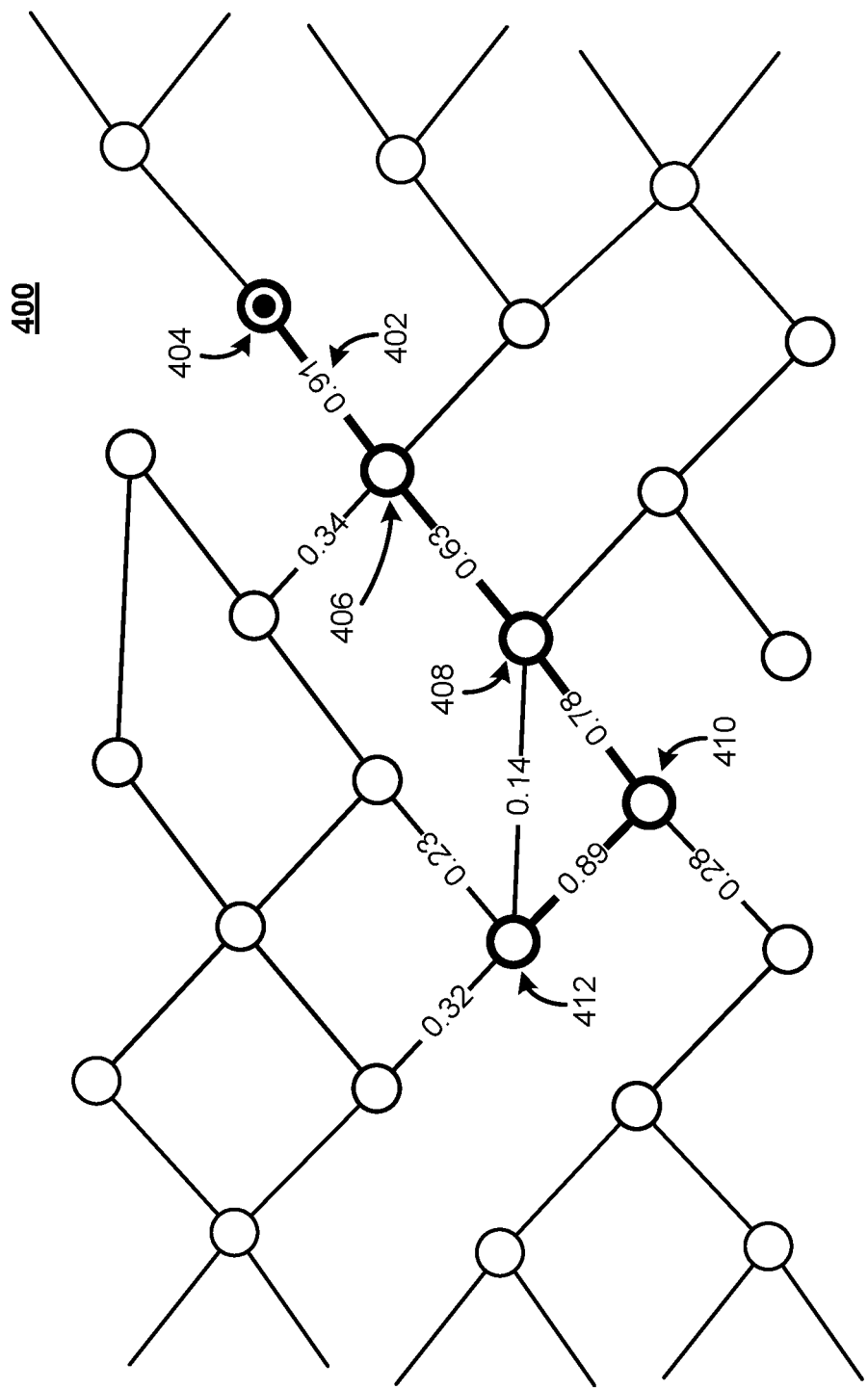
FIG. 4 depicts an example action node mapping that may be generated as prediction model data.

FIG. 4 depicts an action node mapping that may be generated as prediction model data. In some embodiments, an action node map 400 may be generated using a process that builds a knowledge repository of all actions and at least a portion of their attributes. In some embodiments, this repository is automatically built using information extracted from one or more data sources. In some embodiments, the data sources may be unrelated to each other. For example, actions related to users' online interactions may be obtained from server logs as clickstream data. In another example, users' television viewing history may be obtained from television service providers. In some embodiments, actions may be associated with a pre-identified sequence of actions. For example, the action "download_mobile_application" may be followed by "first_mobile_application_sign-in," which may be followed by "first_mobile_application_purchase" in a predetermined action sequence. In some embodiments, the action node map 400 may be generated by identifying correlations between the performance of various actions by users in the past.

In some embodiments, the action node map may include a number of action nodes and connectors 402, which indicate a relationship between two action nodes. In some embodiments, a connector 402 may be associated with a weight (e.g., a steady-state probability). The weight assigned to each connector may create a bias toward particular actions during generation of an action sequence. In some embodiments, the weight assigned to each connector may be calculated based on a number of co-occurrences of the actions connected by the connector. For example, a weight may be assigned to a connector between Action A and Action B that corresponds to a probability that a user performing Action A will go on to perform Action B. In some cases, connectors associated with weights below a threshold weight value may be removed from the action node map, indicating that there is no substantial relationship between the two actions associated with the connector.

The service provider may identify action nodes within the action node map 400 that constitute a high-value action 404 for a particular user or group of users. The process for identifying a high-value action is described in greater detail elsewhere in this specification. Once identified, the action node map 400 may be used to generate a sequence of actions that includes the identified high-value action. This may be done in a number of ways.

In some embodiments, the service provider may use an algorithm such as RWR to discover serendipitous (e.g., unobvious) sequences of actions that result in performance of a high-value action. In these embodiments, RWR simulates a random walk through the action node map 400 by transitioning from a high-value action to a related action in the next step of the walk. For example, the service provider may generate sequences of actions by randomly assigning action nodes within the action node map 400 as "seeds" and identifying probable next actions in the sequence. In some embodiments, sequences may be generated based on random numbers and the sequences of actions with the highest number of occurrences (e.g., the most probable) may be kept. In some embodiments, the service provider may pre-generate sequences of actions using RWR. Upon determining that a particular action is a high-value action for a user, the service provider may identify each of the sequences of actions previously discovered that include the high-value action. The service provider may then determine which of the sequences of actions are most appropriate. In some embodiments, this may be the most commonly occurring sequence over the course of running the RWR algorithm.

In some embodiments, the service provider may generate a sequence of actions by assessing the connectors between an index action node (a node which is currently being analyzed) and other action nodes in order to determine which of the other action nodes is most likely to lead to the index action node (e.g., based on a weight of the connectors). The action node most likely to lead to the index action node is then appended to the beginning of the sequence and is made the new index action node. The process is then iteratively repeated until there are no action nodes likely to lead to the index node (e.g., any connectors to the index node may be assigned weights under a threshold weight value).

By way of illustrating the above process for generating a sequence of actions from the action node map 400, the service provider may identify an action node 404 as being associated with an action determined to be a high-value action with respect to a particular user. In this illustrative example, the service provider may initially start with a sequence of actions that includes the action associated with action node 404. In this illustration, action node 404 is initially made the index node. The service provider may then determine that, based on a weight assigned to connectors between the two actions, action node 406 has the highest probability of leading to the index action node according to the action node map 400. Based on this analysis, the action associated with action node 406 may be appended to the beginning of the action sequence that includes action node 404. Action node 406 is then made the index node and the process is repeated. In this example, the process may complete upon determining that the only action node that leads to the index node is associated with a weight below a threshold value. For example, if the threshold value is 0.40, then upon determining that the only action node leading to action node 412 is assigned a weight of 0.32, the process of generating the sequence of actions may end. In this illustrative example, the sequence generated is (action node 412, action node 410, action node 408, action node 406, action node 404). It should be noted that the action node map 400 depicted in FIG. 4 represents a simplified example of an action node map for illustrative purposes only. An action node map may include many more action nodes and connectors than what is depicted. In some embodiments, each of the action nodes in an action node map may share a connector with every other action node of the action node map.

In some embodiments, an action node map 400 as depicted in FIG. 4 may be used to generate a user-specific action node map. For example, the system may identify scores or rankings to be associated with specific action nodes within the network of action nodes. The system may then calculate scores for each of the action nodes in the user-specific action node map based on both a current ranking and a relationship of the action node to other actions. For example, the system may initially assign rankings to certain action nodes within the user-specific action node map based on the calculated value of the action associated with that action node to the specific user. The action nodes provided an initial score may be a subset of the total set of actions. The system may then iteratively update the scores associated with each action node to account for both the current score of the action node itself and the score of (and relationship to) each of its neighbors. In some embodiments, an action node that may not be predicted to result in a high level of revenue may be scored very highly if it is likely to result in performance of a number of high-value actions. In this way, the rankings for each action node may represent information about that action node's relative value within the network.

In at least some embodiments, the disclosed system may select an action node as being associated with a gateway action based on its score. For example, although an action node may be highly scored because it may be associated with a high-value action, it may also be highly scored because it is likely to lead to performance one or more actions that are high-value for a user. In this example, it may be appropriate to rank each action node based on its score (e.g., from highest to lowest) and present an action node associated with a highly scored action to the user, as it may eventually result in the performance of a high-value action. In some embodiments, the action node selected may be the highest-ranked action node. In some embodiments, the action node selected may be an action node meeting predetermined conditions (e.g., within the highest ranking 20% of action node scores and having the highest likelihood of being performed by the user).

Figure 5:
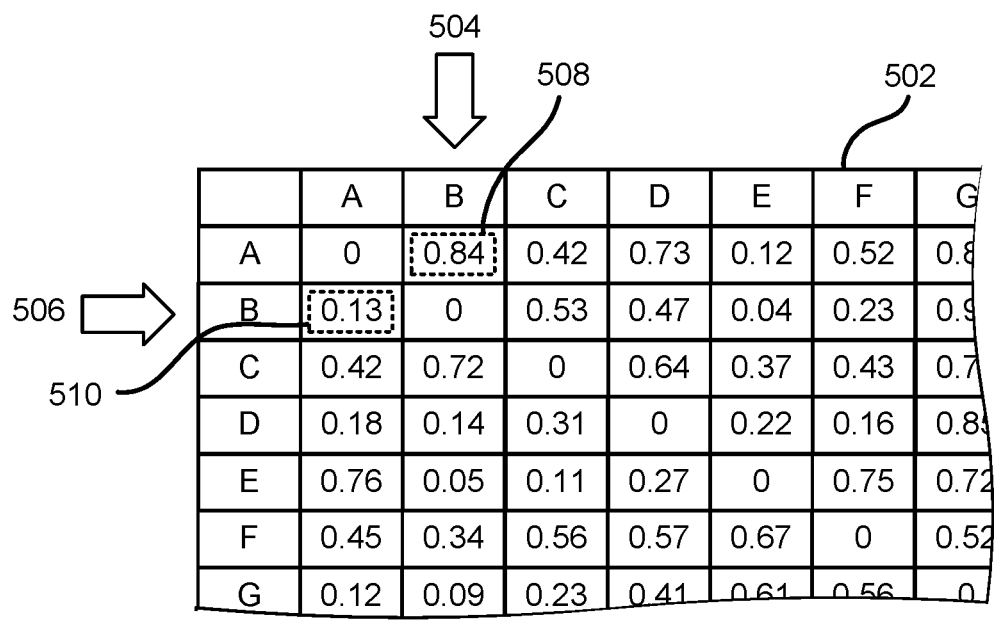
FIG. 5 depicts example prediction model data as it may be stored in a database table.

FIG. 5 depicts prediction model data as it may be stored in a database table. Prediction data table 502 may include a number of rows and a number of columns. In some embodiments of the prediction data table 502, an action may be associated with both a row and a column. For example, Action B may be associated with column 504 and row 506. In this example, column 504 may store the probabilities that other actions will lead to the performance of Action B, such that data field 508 may represent the probability that users who perform Action A will subsequently perform Action B. In contrast, row 506 may store the probabilities that performance of Action B will result in performance of another action associated with each column, such that data field 510 may represent the probability that users who perform Action B will subsequently perform Action A. Accordingly, the prediction data table 502 inherently stores an order in which actions may be performed.

By way of illustrating the above process for generating a sequence of actions from the prediction data table 502, the service provider may perform a process similar to that described above with respect to FIG. 4. In this process, the service provider may first identify a high-value action with respect to a particular user. Identifying a high-value action with respect to a user is described in greater detail elsewhere in the specification. For the purposes of this illustrative example, consider the scenario in which the service provider identifies Action D as being a high-value action. This example will assume that each of the rows and columns of the prediction data table 502 correspond with their similarly-labeled action. For example, row A and column A of the prediction data table 502 each correspond to Action A.

Once Action D has been identified as a high-value action, a sequence of actions may be generated to include Action D. Initially, the sequence of actions may be generated as an empty set and Action D may be added to that empty set. The service provider may then query column D (associated with Action D) to identify a data field within column D having the maximum or highest value and not being associated with an action already in the sequence of actions. Using the data available in FIG. 5, the service provider may select row A because it contains the highest data field value. Because this row is associated with action A, Action A may be appended to the beginning of the sequence of actions (indicating that Action A will be performed prior to Action D in the sequence of actions). The service provider may then repeat this process by querying column A to identify a data field within column A with the maximum or highest value not associated with an action already in the sequence of actions. As depicted, this would lead to row E, which is associated with Action E. Action E may be appended to the beginning of the sequence of actions (indicating that Action E will be performed prior to both Action A and Action D in the sequence of actions). The process is once more repeated by querying column E to identify a data field within column E with the maximum or highest value not associated with an action already in the sequence of actions. As depicted, this would lead to row F, which is associated with Action F. Action F may be appended to the beginning of the sequence of actions. Once column F is queried, the service provider may detect that the data field in row E contains the highest value. However, because Action E is already in the sequence of actions, the service provider may look to the data field that contains the second-highest value, which is row C. This may be repeated until no data fields in a column that are associated with actions not already included in the sequence of actions contain a value over a minimum threshold value. For example, if the minimum threshold value is 0.20, then the process will complete in this illustrative example when the action sequence is (Action B, Action C, Action F, Action E, Action A, Action D).

In some embodiments, the service provider may further utilize data stored in the prediction data table 502 during one or more processes performed by the service provider. For example, when determining which action in the sequence of actions to present as a gateway action, the service provider may consider the probabilities of each action resulting in the high-value action as well as the probability that a user will perform a particular action upon its presentation.

Figure 6:
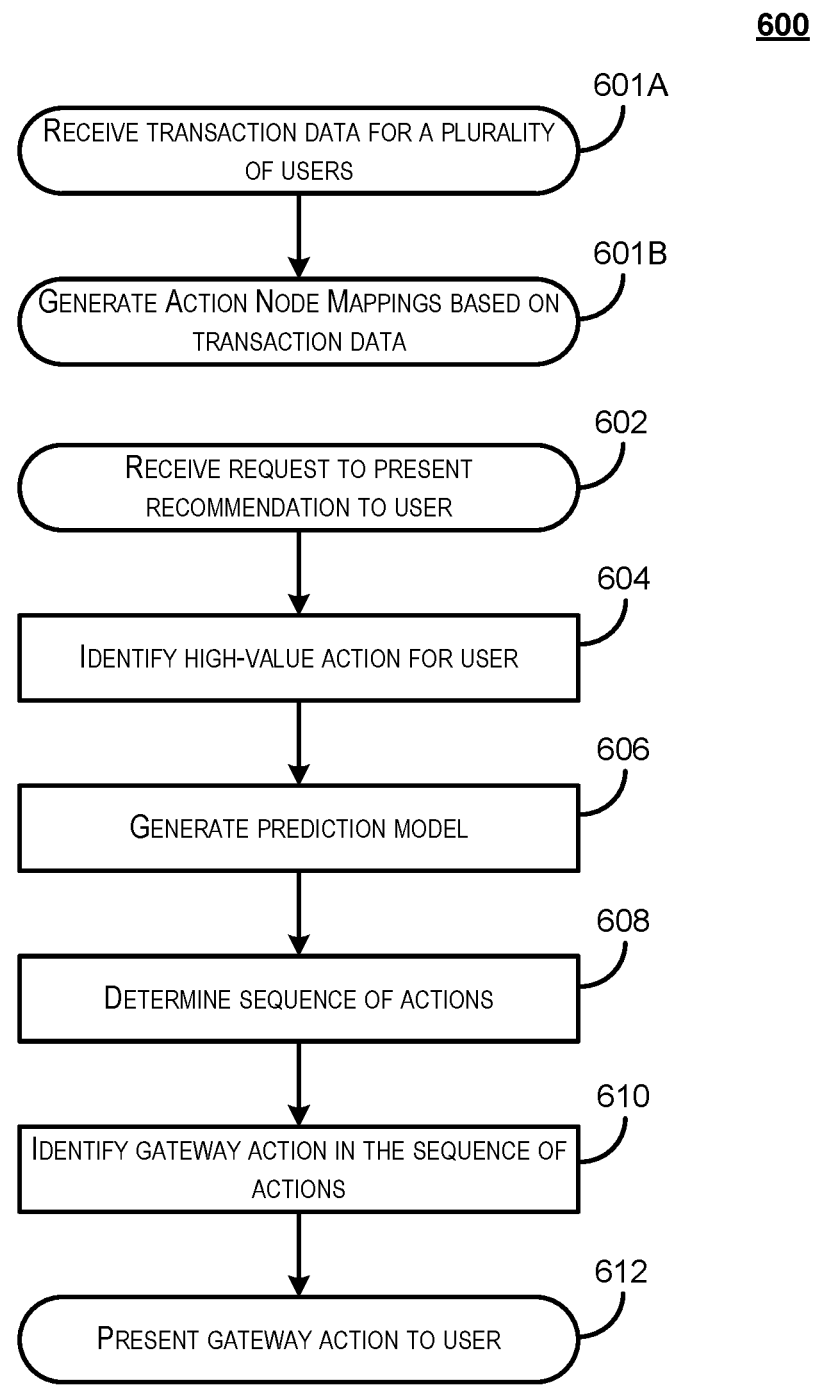
FIG. 6 depicts an example flow diagram illustrating a process for identifying a high-value action for a user and providing an action recommendation to the user in accordance with at least some embodiments of the disclosure.

FIG. 6 depicts a flow diagram illustrating a process for identifying a high-value action for a user and providing an action recommendation to the user in accordance with at least some embodiments of the disclosure. In accordance with at least some embodiments, the process 600 may be implemented at least partially by the service provider 206 depicted in FIG. 2.

Before process 600 begins, the service provider may receive transaction data from a plurality of users at 601A. The transaction data may be received from a number of different sources, some of which may be operated by an entity different from the service provider. The service provider may, based on this received transaction data, generate action node mappings at 601B. For example, the service provider may identify correlations between each of the actions in the received transaction data and build a mapping of action nodes and connectors as depicted in FIG. 4 described above.

In some embodiments, process 600 may begin at 602, when a request is received to present a recommended action to a target user. In some embodiments, a request may automatically be generated upon receiving any indication that the target user is in communication with the service provider and is able to receive a recommendation. For example, the target user may log into a mobile application installed upon a user device, that enables communication with the service provider. In this example, the target user may be identified based on login information. In a second example, a request may automatically be generated upon the target user visiting a website operated by the service provider. In this second example, the target user may be identified based on an internet protocol address from which the website is accessed.

At 604, a high-value action is identified for the target user based on historical data associated with the target user. In some embodiments, this may involve identifying other users with which the target user shares similarities, calculating a value for potential actions that may be performed by the target user with respect to the other users, and identifying those actions for which a calculated value exceeds a threshold value.

At 606, a prediction model is generated comprising information associated with a number of actions and relationships between the actions. In some embodiments, a service provider may monitor user interactions with the service provider in order to record relationships between actions. For example, the service provider may indicate a correlation between two actions based on their co-occurrence by a single user within a predetermined amount of time. In some embodiments, timestamp information may be obtained for a single user from a number of different sources and compared in order to identify correlated actions in this manner. For example, by retrieving a user's clickstream data from an electronic marketplace server and by retrieving that user's viewing history from an online media presentation site, the service provider may determine that the user purchased Product A shortly after watching Movie B. In this example, the service provider may increment a recorded correlation between the action "watch Movie B" and "purchase Product A." It should be noted that the service provider need not perform any analysis to establish any connection between watching Movie B and purchasing Product A. Accordingly, the system is able to exploit correlations between actions that are not immediately obvious.

At 608, the process may determine, using the prediction model, a sequence of actions likely to result in execution of the high value action by the user. In some embodiments, the sequence of actions may be generated by identifying actions likely to lead to performance of the high-value action and appending those actions to the sequence of actions. Example processes of generating a sequence of actions are described in greater detail above with respect to FIG. 4 and FIG. 5.

At 610, a gateway action may be identified within the generated sequence of actions. In some embodiments, the gateway action may be the action in the sequence of actions that is most likely to be performed by the user. In some embodiments, the service provider may calculate a likelihood of a particular recommendation resulting in performance of the high-value action. This may involve estimating the likelihood that performance of a particular action in the sequence of actions will result in the high-value action as well as a likelihood of the user performing the particular action to be recommended.

At 612 the gateway action may be presented to the user. In some embodiments, the service provider may present notification including an indication of the gateway action to a user device to be presented to the target user. In some embodiments, the service provider may present each of the actions in the sequence of actions to the user. For example, the service provider may initially present a recommendation related to the gateway action to the user. Upon detecting that the gateway action has been performed, the service provider may subsequently present a recommendation for the next action in the sequence of actions to the user. This process may be repeated until a recommendation is presented to the user to perform the high-value action.

Figure 7:
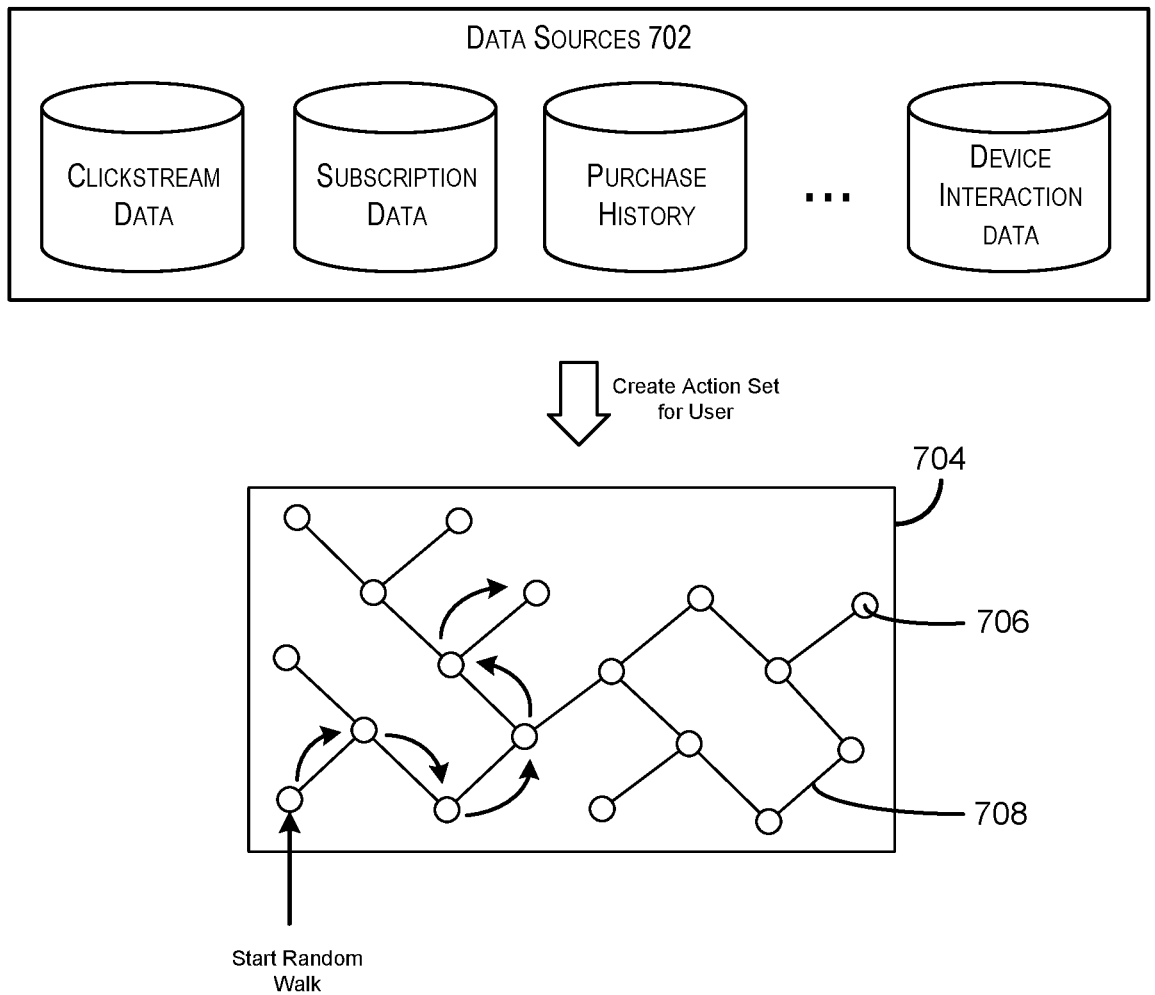
FIG. 7 depicts an illustrative example of a process for identifying high-value actions for a user using an action node map for that user.

FIG. 7 depicts an illustrative example of a process for identifying high-value actions for a user using an action node map for that user. In at least some embodiments, the process may involve identifying a number of actions associated with the user from a number of different sources, generating an action map that includes those actions, using a random walk algorithm (e.g., random walk with restart) to calculate a propensity for each action, and identifying high-value actions based on the results of the random walk algorithm.

In FIG. 7, the process may begin when a set of actions are aggregated for a user from a number of data sources 702. The data sources may be separate, in that each and/or some of those data sources may be operated by separate entities. Some non-limiting examples of data sources that may be pulled from are clickstream data, subscription data, purchase history, device interaction data, search query data, social network data, or any other suitable user-related data. For example, a service provider may obtain one or more server logs from a webserver to determine what actions the user performed with respect to a particular webpage (e.g., what links were accessed, what items were viewed, where the user paused or stopped scrolling, where the user placed a cursor, etc.). The service provider may also obtain timestamp information that helps the server match up each action with respect to time and the other actions, from which relationships between the actions may be determined.

The data obtained from the various data sources 702 may then be parsed to identify a number of actions performed by the user, as well as relationships between those actions. This information may be used by the service provider to create a map of action nodes 704 for the user based on the actions that the user has taken in the past and the determined relationships between those actions. In this map of action nodes 704 may be depicted a number of action nodes 706 that represent actions and connectors 708 that represent relationships between various actions. Each connector may be associated with a weight or value which indicates a strength of the relationship between the two actions which it connects. For example, when generating the map of action nodes 704, connections between various actions may be added when a relationship is detected. In this example, each time that the relationship is reinforced (e.g., the two actions are performed together a second time), a weight associated with the connector may be increased to indicate a stronger relationship between the actions. The weight may also take into account the frequency with which particular actions are performed together. Once this graph-based representation of actions (map of action nodes 704) has been generated to capture both transitive and non-transitive associations between action nodes by discovering relationships between them, the service provider may use a random walk algorithm to discover serendipitous high-value actions.

During the process depicted in FIG. 7, the service provider may implement a random walk algorithm to determine a "stickiness" (e.g., a propensity) for each action node. In this phase of the depicted process, the service provider may initiate a number of random walks (e.g., 1000 random walks) by randomly selecting a starting node within the map of action nodes 704 and randomly traversing between connected action nodes. In some embodiments, the random walk algorithm may take into account weights associated with a connector or connectors. For example, a connector with a high weight may represent a stronger relationship than a connector with a low weight, hence the random walk algorithm may be more likely to traverse the connector with the high weight. Once the random walk algorithm has been repeated a number of times, the service provider may determine how many times each action node in the map of action nodes 704 was visited in the random walks. This is then used to determine the probability that, given any starting location in the map of action nodes 704, the user will result in performing the action associated with the particular action node. This likelihood that an action node will be visited by the user would represent the propensity of the user to perform that action given a starting node.

In some embodiments, the service provider may identify a downstream impact (DSI) for each of the actions represented as action nodes in the map of action nodes 704. For example, the service provider may identify users similar to the one currently being considered and may identify a benefit or cost that has resulted from performance of the action by users similar to the one being considered. Once a DSI is calculated with respect to the action, that DSI may be multiplied by the propensity associated with the action node. The product of the DSI and the propensity for each action node may be stored as a score for that action node. If a score for a particular action node is greater than a threshold value, then the action associated with that action node may be considered a high-value action. In some embodiments, each action node may be ranked based on its score (e.g., from highest score to lowest score). In this way, an action may receive a high score (and be ranked highly) if it has a high propensity and is likely to lead to performance of a high-value action, even if it has a low DSI. In some embodiments, rankings for action nodes may be used to provide a recommendation for a particular action. For example, a recommendation for the highest-ranking action may be provided to the user.

Embodiments of the disclosure provide a number of advantages over current systems. For example, embodiments of the disclosure enable a recommendation to be provided for an action that may eventually lead to performance of a high-value action. Conventional systems may identify high-value actions, but those conventional systems then simply provide a recommendation to the user to simply perform the high-value action. This is less than ideal as a user may not be comfortable with the high-value action (e.g., the customer may not be familiar with the action or may not have the means to perform it). By identifying actions likely to lead to the performance of the high-value action, the current disclosure enables a service provider to provide recommendations for actions that the user is more likely to engage in than the high-value action. This has the advantage of building the comfort level of the user and indirectly encourages the performance of the high-value action.

Figure 8:
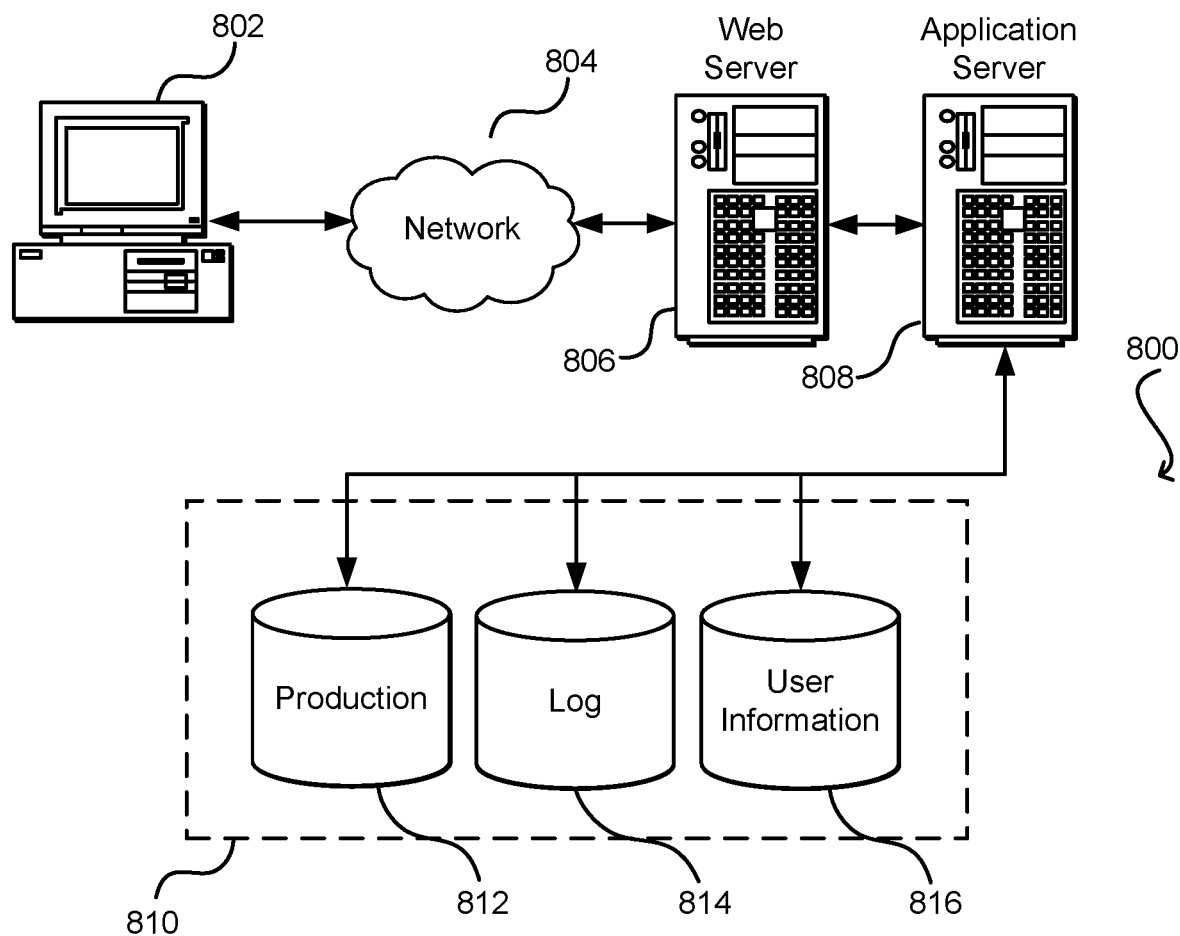
FIG. 8 illustrates an example environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method performed by a computer system of a service provider, comprising:
   receiving a request to present an action recommendation to a user;
   identifying, with respect to the user, a set of actions based on historical data associated with the user;
   identifying, within the set of actions, a high-value action desired by the service provider for the user to perform, the high-value action having a first probability of being performed by the user as a next action;
   generating prediction model data that indicates relationships between actions among a plurality of actions, the prediction model data including an action that corresponds to the high-value action;
   determining, using the prediction model data, a sequence of actions likely to result in execution of the high-value action by the user;
   identifying, within the sequence of actions, an action with a higher probability of execution by the user as the next action than the first probability of the high-value action being performed by the user as the next action, and wherein, upon being executed by the user as the next action, has a high probability of inducing the user to subsequently perform the high-value action; and
   providing for presentation the action recommendation as a notification including the action with the higher probability of execution to the user.

2. The computer-implemented method of claim 1, wherein the historical data associated with the user comprises a set of actions performed by the user in relation to an online retailer.

3. The computer-implemented method of claim 1, wherein identifying the high-value action comprises comparing the historical data associated with the user to a second historical data associated with a plurality of users.

4. The computer-implemented method of claim 1, wherein the prediction model data comprises a map of action nodes.

5. The computer-implemented method of claim 1, wherein the high-value action is predicted to result in a benefit to the user.

6. The computer-implemented method of claim 5, wherein the benefit is specific to the user among a plurality of users.

7. A system of a service provider, comprising:
   a processor; and
   a memory including instructions that, when executed with the processor, cause the system to at least:
      receive a request to present an action recommendation to a user;
      identify, with respect to the user, a set of actions based on historical data associated with the user;
      identify, within the set of actions, a high-value action desired by the service provider for the user to perform, the high-value action having a first probability of being performed by the user as a next action;
      generate prediction model data that indicates relationships between actions among a plurality of actions, the prediction model data including an action that corresponds to the high-value action;
      determine, using the prediction model data, a sequence of actions likely to result in execution of the high-value action by the user;

identify, within the sequence of actions, an action with a higher probability of execution by the user as the next action than the first probability of the high-value action being performed by the user as the next action, and wherein, upon being executed by the user as the next action, has a high probability of inducing the user to subsequently perform the high-value action; and provide for presentation the action recommendation as a notification including the action with the higher probability of execution to the user.

8. The system of claim 7, wherein the action is a gateway action that occurs prior to the high-value action within the sequence of actions.

9. The system of claim 8, wherein presenting the gateway action to the user comprises displaying a button that, when activated, causes the gateway action to be executed.

10. The system of claim 9, wherein the instructions further cause the system to present at least one action subsequent to the gateway action in the sequence of actions upon determining that the gateway action has been performed by the user.

11. The system of claim 7, wherein the instructions further cause the system to determine, for individual actions in the sequence of actions, a likelihood of the individual action being performed by the user.

12. The system of claim 7, wherein the high-value action comprises a second action estimated to result in at least one of a revenue or a profit over a threshold amount.

13. The system of claim 7, wherein determining the sequence of actions is based at least in part on prediction model data that contains information associated with relationships between actions that may be performed by one or more users.

14. A non-transitory computer readable medium storing specific computer-executable instructions that, when executed with a processor, cause a computer system of a service provider to, at least:

receive a request to present an action recommendation to a user;

identify, with respect to the user, a set of actions based on historical data associated with the user;

identify, within the set of actions, a high-value action desired by the service provider for the user to perform, the high-value action having a first probability of being performed by the user as a next action;

generate prediction model data that indicates relationships between actions among a plurality of actions, the prediction model data including an action that corresponds to the high-value action;

determine, using the prediction model data, a sequence of actions likely to result in execution of the high-value action by the user;

identify, within the sequence of actions, an action with a higher probability of execution by the user as the next action than the first probability of the high-value action being performed by the user as the next action, and wherein, upon being executed by the user as the next action, has a high probability of inducing the user to subsequently perform the high-value action; and provide for presentation the action recommendation as a notification including the action with the higher probability of execution to the user.

15. The non-transitory computer readable medium of claim 14, further comprising instructions that are executable by the processor to, at least:

identify, based on the historical data, initial scores for a subset of the set of actions;

determine, for individual actions in the set of actions, a score based at least in part on the initial scores for the subset of the set of actions and relationships between the individual action and other actions in the set of actions;

rank the individual actions in the set of actions based on the scores; and identify the action with the high probability of execution by the user based at least in part on the ranking, the action chosen from among the ranked individual actions.

16. The non-transitory computer readable medium of claim 15, wherein identifying the action with the high probability of execution by the user based at least in part on the ranking comprises selecting an action node of a plurality of action nodes meeting predetermined conditions, and wherein nodes of the plurality of action nodes respectively correspond to actions among the plurality of actions.

17. The non-transitory computer readable medium of claim 15, wherein the initial scores for the subset of the set of actions are determined based on a benefit predicted top result from actions within the subset of the set of actions.

18. The non-transitory computer readable medium of claim 15, wherein the scores for individual actions in the set of actions are determined based at least in part on scores associated with neighboring actions in an action node map that corresponds to a plurality of action nodes, the plurality of action nodes respectively correspond to actions among the plurality of actions.

19. The non-transitory computer readable medium of claim 18, wherein the scores for individual actions in the set of actions are also determined based at least in part on a likelihood of performance of the individual action resulting in performance of the neighboring actions.

20. The non-transitory computer readable medium of claim 19, wherein the likelihood of performance of the individual action resulting in performance of the neighboring actions is determined based on historical data compiled with respect to a plurality of users.

* * * * *